United States Patent [19]

Fujii

[11] 4,257,840
[45] Mar. 24, 1981

[54] HOT-PRESS MACHINE WITH FACING LAYER CARRYING AND SETTING APPARATUS

[75] Inventor: Toshihiko Fujii, Atsugi, Japan

[73] Assignee: Nissan Motor Company, Limited, Yokohama, Japan

[21] Appl. No.: 941,740

[22] Filed: Sep. 12, 1978

[51] Int. Cl.³ .................................................. B32B 31/04
[52] U.S. Cl. ..................................... 156/556; 156/581; 425/126 R; 425/551
[58] Field of Search ........................... 425/126 R, 551; 156/556, 581

[56] References Cited

U.S. PATENT DOCUMENTS 3,892,619   7/1975   Hutz ...................................... 156/556
4,145,239   3/1979   Fujii ...................................... 156/212

Primary Examiner—James H. Derrington

[57] ABSTRACT

Two parallel guide rails are arranged to put therebetween a stationary die of the hot-press machine and a table for sliding therealong respective movers by which a facing layer is carried from a first position to cover the table to a second position to cover the stationary die. First clamping means is disposed on the movers to clamp longitudinally opposed ends of the facing layer, and second clamping means is connected to the stationary die to clamp laterally opposed ends of the facing layer when the facing layer which has been kept clamped by the first clamping means is brought to the second position by means of the movers.

10 Claims, 4 Drawing Figures

HOT-PRESS MACHINE WITH FACING LAYER CARRYING AND SETTING APPARATUS

FIELD OF THE INVENTION

The present invention relates in general to a system and a method for producing a trim board which comprises a substrate of corrugated paperboard and a facing layer laid on one side of the corrugated paperboard.

BACKGROUND OF THE INVENTION

In the field of wall covering materials to afford comforts and/or decorative effects to the interior of cars, ships or buildings, a corrugated paperboard has recently attracted increasing attention as a basic material because of its light weight, low cost, good heat and sound insulating ability and fairly good adaptability to various mechanical processings. A variety of materials such as wood pulp, cotton, flax and felt are used as the paperboard. In automobiles, for example, trim boards such as a roof trim boards of corrugated paperboard base have already been in practical use on an industrial scale. The trim boards of this type usually consist of a substrate of corrugated paperboard and a facing layer such as polyvinyl chloride sheet which is laid on one side of the corrugated paperboard for producing protective, decorative and/or cushioning effects. In most cases, the corrugated paperboard substrate takes the form of a double-faced board given by bonding liners to both sides of a corrugated medium using a thermoplastic resin as the adhesive. Since walls (including ceiling of the automobile) to be covered by the trim boards usually have curved surfaces, the trim boards are produced as at least partly curved boards in conformance with the curved wall surfaces. Press-forming with application of heat is usually used for producing the curved trim boards of corrugated paperboard base. In most cases, the corrugated paperboard alone is formed into a desired shape by means of a hot-press, followed by the application of the facing layer onto the shaped corrugated substrate with the interposal of a hot-melt type adhesive layer and followed by the application of another hot-press to accomplish the bonding between the shaped corrugated paperboard and the facing layer.

In case of setting the facing layer on or over the shaped corrugated paperboard in the hot-press machine, the facing layer should be stationarily held by some holding means to allow the facing layer to be radially outwardly stretched under pressing of the facing layer against the shaped corrugated paperboard in order to avoid undesired wrinkles in the curved areas of the bonded facing layer.

Hitherto, such setting of the facing layer has been made by at least two workers who stand beside the hotpress machine, gripping and pulling the corners of the facing layer radially outwardly. However, it is clear such manual procedure is troublesome thus decreasing the trim board production efficiency of the hot-press machine.

OBJECTS OF THE INVENTION

It is thus an essential object of the invention to eliminate the above-mentioned troublesome working procedure.

It is an object of the present invention to provide a system and a method for efficiently producing a trim board by using an improved facing layer conveying means.

It is another object of the present invention to provide a system and a method for conveying a facing layer to a position over a shaped corrugated paperboard which is previously positioned on a stationary die of a hot-press machine.

According to the present invention, there is provided an apparatus for carrying and setting a facing layer into and at a predetermined position where the facing layer is placed on or over a die face of a stationary die toward which a movable die is movable to press the facing layer against a shaped paperboard which has been positioned on the stationary die, the apparatus comprising: first means for defining a flat top surface which is located beside the stationary die and has a substantially same height as the die face of the stationary die; conveying means comprising a pair of guide rails which are substantially horizontally arranged so as to put a unit of the stationary die and the first means therebetween, two movers which are slidable along the guide rails respectively between the stationary die and the first means, and means for providing simultaneous movement of the two movers along the guide rails; first clamping means disposed on each of said movers to be movable therewith, the first clamping means being operable to clamp both longitudinal ends of the facing layer on the flat top surface with the aid of the movers; and second clamping means connected to the stationary die for clamping both lateral ends of the facing layer when the facing layer is brought to the predetermined position by the movers.

According to the present invention, there is provided a method of carrying and setting a facing layer on or over a die face of a female die toward which a male die is movable for pressing the facing layer against a shaped paperboard which has been positioned in the female die, the method comprising the steps of: (a) placing the facing layer at a first predetermined position in a manner to be substantially parallel with a flat top surface of the female die; (b) clamping both longitudinal ends of the facing layer to prevent the ends from longitudinal movement even if a certain biasing force is applied to the facing layer; (c) conveying the facing layer to a second predetermined position while keeping the parallel relationship between the facing layer and the flat top surface of the female die and keeping both longitudinal ends of the facing layer clamped, the second pretermined position being a position where the facing layer is placed on or over the die face of the female die in which the shaped paperboard is held; (d) clamping both lateral ends of the facing layer to prevent both lateral ends from lateral movement even if a certain biasing force is applied to the facing lawyer; and (e) keeping the longitudinal and lateral ends of the facing layer clamped when the male die is moved to press the facing layer against the paperboard in the female die.

SUMMARY OF THE DRAWINGS

Other objects and advantages of the present invention will become apparent from the following description when taken in conjunction with the accompanying drawings, in which.

DESCRIPTION OF THE PREFERRED EMBODIMENTS

Figure 1:
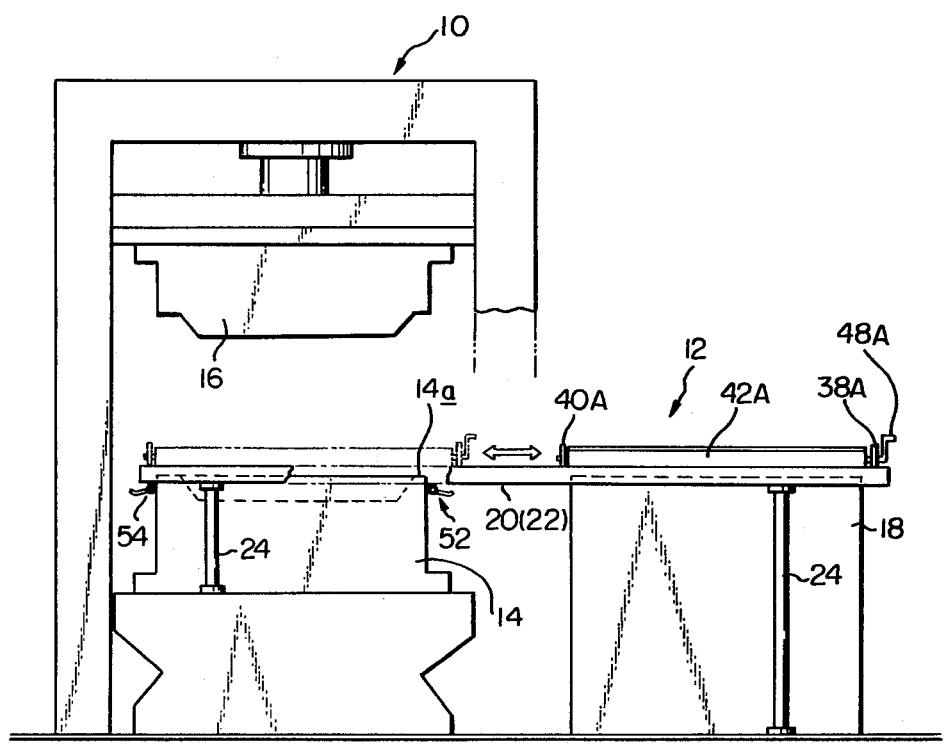
FIG. 1 is a partially cut-away elevation view of a system including a hot-press machine equipped with a facing layer conveying apparatus, according to the invention.
Figure 2:
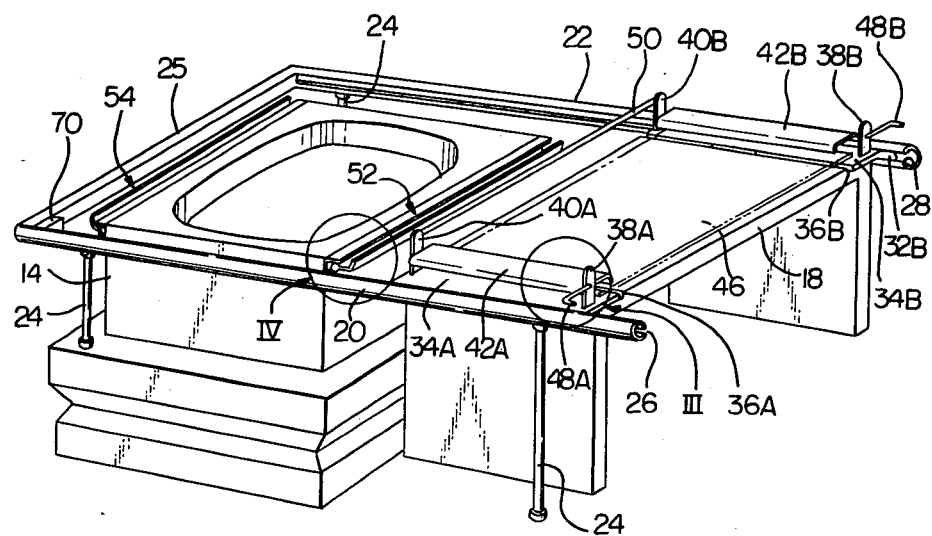
FIG. 2 is a perspective view of the hot-press machine with the facing layer conveying apparatus.

Referring to FIGS. 1 and 2, especially to FIG. 1, there is ilustrated a system of the invention which comprises a hot-press machine 10 and a facing layer conveying apparatus 12. The hot-press machine 10 generally comprises a stationary or female die 14 and a movable or male die 16. Heating means (not shown) is embedded in both the stationary and movable dies 14 and 16, so that the dies 14 and 16 can be heated to desired temperature.

In production of the trim board, a flat corrugated paperboard is formed into a desired shape by the hot-press machine 10 in a conventional manner, then a facing layer which is preliminarily laid with a hot-melt sheet such as polyethylene film is placed over the shaped corrugated paperboard in a manner as will be described hereinafter. Then the heated movable die 16 is lowered to press the facing layer against the shaped corrugated paperboard. As a result, the facing layer is bonded to the shaped corrugated paperboard by the function of the fluidied hot-melt as an adhesive to form a trim board.

The facing layer conveying apparatus 12 is combined with the hot-press machine 10 as shown. The apparatus 12 comprises a table 18 with a flat top surface which is substantially flush with a top 14a of the stationary die 14. Two parallel tubular rails 20 and 22 are arranged to lie along the row of the stationary die 14 and the table 18 in a manner to put therebetween of the stationary die 14 and the table 18, as is well seen in FIG. 2. Denoted by numerals 24 are stands for supporting the rails 20 and 22. A cross rod 25 is spanned between the respective left ends of the tubular rails 20 and 22 for fixed assemblage of the tubular rails 20 and 22. Each of the tubular rails 20 and 22 is formed with a longitudinally extending slit 26 or 28 facing toward the unit of the stationary die 14 and the table 18, as shown in FIG. 2.

For facilitation of the description, the following explanation will be made only with respect to parts located in the front side, in FIGS. 1 and 2, of the facing layer conveying apparatus. The parts located in the back side are substantially the same in construction and configuration as those in the front side. Thus, for ease of understanding and description, parts located in the front side will be indicated by the addition of the letter "A" after each numeral while those in the back side will be indicated by the addition of the letter "B" after each corresponding numeral.

Longitudinally slidably disposed in the tubular rail 20 is a cylindrical section 32A of a mover 30A which has a laterally extending flange section 34A passing through the slit 26. As is well shown in FIG. 3, the leading end of the flange section 34A is slidably received in a recess 36A formed in a longitudinal edge section of the table 18. It should be thus noted that the rotation of the mover 30A about the axis of the cylindrical section 32A is prevented by engagement of the flange section 34A with edges defining the slit 26. On the mover 30A (and 30B) is arranged first clamping means which is described hereinnext.

As is shown in FIG. 2, two spaced supports 38A and 40A stand on the flange section 34A. An elongate clamping plate 42A having a substantially L-shaped cross section is swingably supported at its longitudinal ends by the supports 38A and 40A in a manner to be biased to rotate, by its own weight, in a direction of the arrow $D_1$ of FIG. 3, that is in a direction to allow an inwardly bent section 44A of the clamping plate 42A to be brought into contact with the inwardly leading end of the flange section 34A. As will be well described hereinafter, a facing layer 46 such as polyvinyl chrolide sheet is placed on the table 18 with the edges thereof covering the inwardly leading ends of the flange sections 34A and 34B. Thus, the rotation of the clamping plate 42A (and 42B) in the above-mentioned direction causes the inwardly bent section 44A (and 44B) to press the edges of the facing layer 46 against the flange section 34A (and 34B) thereby to hold the same. This will be understood from FIG. 3.

A handle 48A is fixed to one of the longitudinal ends of the clamping plate 42A so that the clamping plate 42A rotates in a direction to release the facing layer 46 when the handle 48A is pushed down. Although not shown, a known stopper is fixed to each of the movers 30A and 30B, which functions to keep the clamping plate 30A (or 30B) lifted releasing the facing layer 46 until the next handling thereof, that is, push-down operation of the handle 48A (or 48B) takes place.

A connecting rod 50 is connected at its both ends to the supports 40A and 40B so that the sliding movement of the mover 30A along the tubular rail 20 induces the simultaneous movement of the mover 30B along the rail 22. As will be apparent hereinafter, the connecting rod 50 can act as a handle for manually moving the unit of the movers 30A and 30B.

As is shown in FIG. 2, second clamping means is arranged around the stationary die 14, which is denoted by the numerals 52 and 54. For ease of understanding of this drawing, several important parts of this second clamping means are omitted from this drawing.

For facilitation of the description, the following explanation will be directed to only parts constituting the clamping means 52 located in the right and front sides of the stationary die 14 in FIG. 2. The parts of the means 54 located in the left and back sides are substantially the same in construction and configuration as those in the means 52. Thus, for ease of understanding and description, the parts of the right and front-positioned means 52 will be indicated by the addition of the letter "A" after each numeral while those of the left and back-positioned means 53 will be indicated by the addition of the letter "B" after each corresponding numeral.

Figure 4:
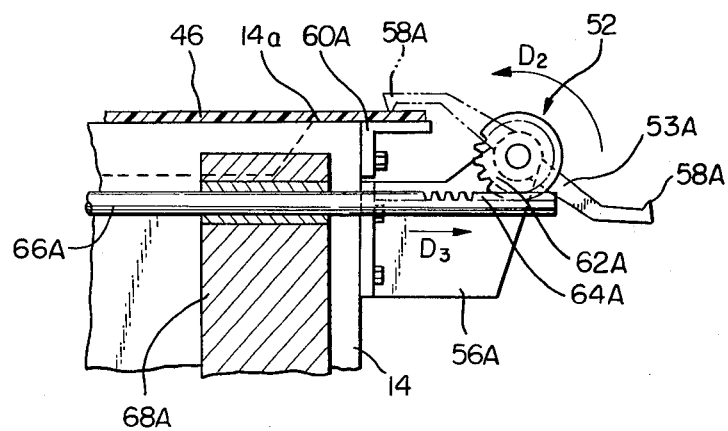
FIG. 4 is an elevation view of a part enclosed by a circle denoted by reference IV.

In FIG. 4, there is illustrated, in detail, the construction and configuration of the clamping means 52. The clamping means 52 comprises an elongate clamping plate 53A having a substantially L-shaped cross section. The plate 53A is swingably supported on brackets 56A fixed to the right side of the stationary die 14 so that when the plate 53A rotates in the direction of the arrow $D_2$ the leading bent end 58A of the plate 53A is brought into contact with an upper surface of a flange member 60A secured to the right side of th stationary die 14. As will be understood hereinafter, such rotation of the plate 53A occurs when the facing layer 46 is placed over the die face 14a of the stationary die 14 by the afore-mentioned movers 30A and 30B. Thus, such rotation causes the bent end 58A to press laterally opposed ends of the facing layer 46 against the flange member 60A to hold the same.

A pinion 62A is fixed to the axial end of the clamping plate 53A for rotation therewith. The pinion 62A is meshingly engaged with a rack portion 64A formed on an end of an elongate rod 66A which is longitudinally slidably held by a support member 68A located beside the front side of the stationary die 14. Although not shown in the drawings, the other end of the rod 66A is connected to a plunger rod of a known fluid power cylinder so that fluid supply into the power cylinder causes movement of the elongate rod 66A in the direction of the arrow $D_3$ rotating the pinion 62A and thus the clamping plate 53A in the direction of the arrow $D_2$, that is in the direction to hold the lateral end of the facing layer 46 on the flange 60A. The fluid power cylinder may be used to actuate also the parts constituting the left and back-positioned clamping means 54 with an aid of a conventional linking mechanism (not shown) so that the fluid supply to the fluid power cylinder causes both clamping means 52 and 54 to hold both lateral ends of the facing layer 46. A limit switch 70 (see FIG. 2) is fixed to an inside portion of the cross rod 25 and is electrically connected to a known electromagnetic valve (not shown) which functions to open a passage between a fluid supply source (not shown) and the fluid power cylinder when electrically energized in response to close operation of the limit switch 70. The limit switch 70 hereinshown is arranged to close when the mover 30A, more specifically the left edge of the same is brought into contact with the switch 70 and to open when the left edge is separated from the switch 70.

With the above, the carriage of the facing layer 46 to the die face 14a of the stationary die 14 is made as follows.

Figure 3:
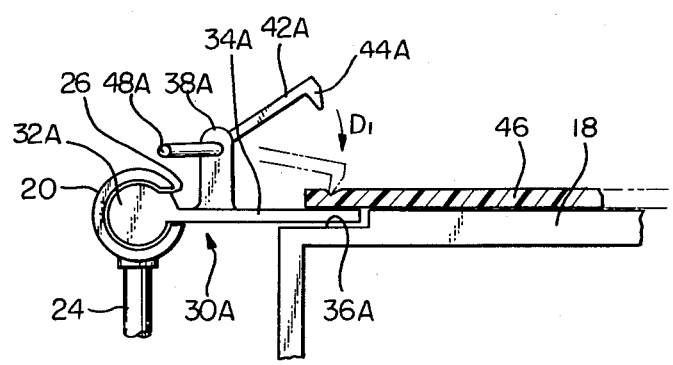
FIG. 3 is a side elevation view of a part enclosed by a circle denoted by reference III in FIG. 2.

The facing layer 46 which has been deposited on a predetermined storing place is placed on the table 48 in a manner that longitudinally opposed ends of the layer 46 cover the inwardly leading ends of the flange sections 34A and 34B of the movers 30A and 30B, as will be understood from FIG. 3. During this, the clamping plates 42A and 42B are kept lifted in order not to obstruct the placement of the ends of the facing layer 46 onto the flange sections 34A and 34B by the function of the stoppers aforementioned. Then, the handles 48A and 48B are manually pushed down by an operator for disengagement of the stoppers, so that the clamping plates 42A and 42B rotate into the position by their own weights to press or hold the facing layer 46, as is shown by a phantom line in FIG. 3. From this, it is to be noted that the facing layer 46 is stationarily held on the table by the clamping means on the movers 30A and 30B.

Then the movers 30A and 30B are pushed manually toward the stationary die 14 by the operator so that the movers 30A and 30B run along the tubular rails 20 and 22 to a predetermined position where the facing layer 46 is placed over the die face 14a, that is, where the lateral ends of the facing layer 46 are placed on the flange members 60A and 60B fixed to the stationary die 14. When the movers 30A and 30B come to such position, the limit switch 70 closes causing the fluid power cylinder to be fed with the fluid from the fluid supply source so that the clamping plates 53A and 53B rotate to press the lateral ends of the facing layer 46 against the flange members 60A and 60B to hold the same. With this, the facing layer 46 is tightly set over the die face 14a of the stationary die 14.

After the above, the heated movable die 16 is lowered to press the facing layer 46 against the shaped corrugated paperboard which has been set on the stationary die 14. During the movement of the movable die 16, the facing layer 46 is tightly held by the first and second clamping means. Thus, the facing layer 46 is neatly bonded to the shaped corrugated paperboard without producing undesirable wrinkles therein.

After completion of the bonding of the facing layer 46 to the paperboard, the electromagnetic valve of the fluid power cylinder is de-energized by manually turning off another known switch (not shown) connected in series to the afore-mentioned limit switch, so that the clamping plates 53A and 53B of the second claming means rotate to release the facing layer 46. Then the clamping plates 42A and 42B of the first clamping means are lifted to release the facing layer 46 by pushing the handles 48A and 48B down. Then, the movers 30A and 30B can be moved back manually by the operator toward the table 18. Although not shown, suitable stopping means is arranged in the right-most portion of each tubular rail 20 or 22 to limit the rightward movement of the movers 30A and 30B.

From the above, it will be appreciated that the setting of the facing layer 46 over the die face 14a of the stationary die 14 is easily and reliably achieved by only using simple manual working procedure in comparison with the afore-mentioned conventional manual process necessitating two workers.

In addition to the above-described construction of the facing layer conveying apparatus of the invention, the following modifications are available in the invention.

(1) Biasing means such as springs and electromagnets may be used for increasing the clamping force of the clamping plates 42A, 42B, 53A and 53B.

(2) By using a fluid power cylinder of a type mentioned above, the movement of the movers 30A and 30B along the tubular rails 20 and 22 is made without using manual labour.

(3) The first and second clamping means may be arranged to stretch the facing layer outwardly in both longitudinal and lateral directions for achieving more reliable and neat bonding between the facing layer 46 and the corrugated paperboard.

The foregoing description shows only a preferred embodiment of the present invention. Various modifications are apparent to those skilled in the art without departing from the scope of the subject invention which is only limited by the appended claims. Therefore, the embodiment shown and described is only for illustration, not restrictive.

What is claimed is:

1. A system for producing a trim board which comprises a substrate of corrugated paperboard and a facing layer which is laid on one side of said corrugated paperboard, comprising:
   a hot-press machine including a stationary die and a moveable die, said movable die being movable to press a facing layer against a shaped corrugated paperboard which is previously positioned on said stationary die;
   first means having a flat top surface which is located beside said stationary die and is substantially flush with the top of said stationary die;
   conveying means for conveying said facing layer from said flat top surface of the first means to said stationary die over said shaped corrugated paperboard, said conveying means including two spaced guide rails which extend in a substantially parallel relationship and which locate said stationary die and said first means therebetween, two movers which are slidable on and along said guide rails respectively between said first means and said stationary die, and a connecting rod having opposed ends respectively connected to said movers to provide simultaneous movements of said movers;

first clamping means mounted to said movers and movable therewith, said first clamping means being capable of clamping longitudinally opposed ends of said facing layer on said flat top surface; and second clamping means mounted to said stationary die, said second clamping means being capable of clamping laterally opposed ends of said facing layer when said facing layer having been clamped by said first clamping means is brought, by said movers, to a position to cover said stationary die.

2. A system as claimed in claim 1, in which said first clamping means comprises:

two spaced supports mounted on each of said movers; and two elongate plates each being swingably supported at longitudinally opposed ends thereof by the two supports, each of said elongate plates having a lateral edge which is brought into contact with the associated mover when said plate rotates in a predetermined direction.

3. A system as claimed in claim 2, in which said elongate plate is biased to rotate in said predetermined direction.

4. A system as claimed in claim 3, in which said first clamping means further comprises a handle which is connected to said elongate plate for manually operating the same.

5. A system as claimed in claim 3, in which said lateral edge of said elongate plate is bent inwardly to allow the plate to have a substantially L-shaped cross section.

6. A system as claimed in claim 3, in which said second clamping means comprises:

brackets fixed to each of the opposed sides of said stationary die;

two elongate plates, each plate being swingably supported on said brackets and having a lateral edge which is brought into contact with a flange member fixed to the associated lateral side of said stationary die when said plate rotates in a predetermined direction; and actuating means for actuating each of said elongate plates to rotate in said predetermined direction when said movers are moved to said stationary die.

7. A system as claimed in claim 6, in which said lateral edge of said elongate plate of said second clamping means is inwardly bent to allow the plate to have a substantially L-shaped cross section.

8. A system as claimed in claim 6, in which said actuating means comprises:

a pinion gear coaxially fixed to said elongate plate of said second clamping means to be rotatable therewith; and a rack member meshingly engaged with said pinion gear, the longitudinal movement of said rack member inducing rotation of said pinion gear and thus rotation of said elongate plate.

9. A system as claimed in claim 1, in which each of said guide rails of said conveying means is a tubular member which has a longitudinally extending slit, and in which each of said movers comprises a cylindrical section slidably disposed in said tubular member, and a flange section extending from said cylindrical section and passing through said slit.

10. A system as claimed in claim 9, in which said longitudinal end section of said flat top surface is formed with a recess into which the leading end of said flange section is slidably received.

* * * * *